UNITED STATES PATENT OFFICE.

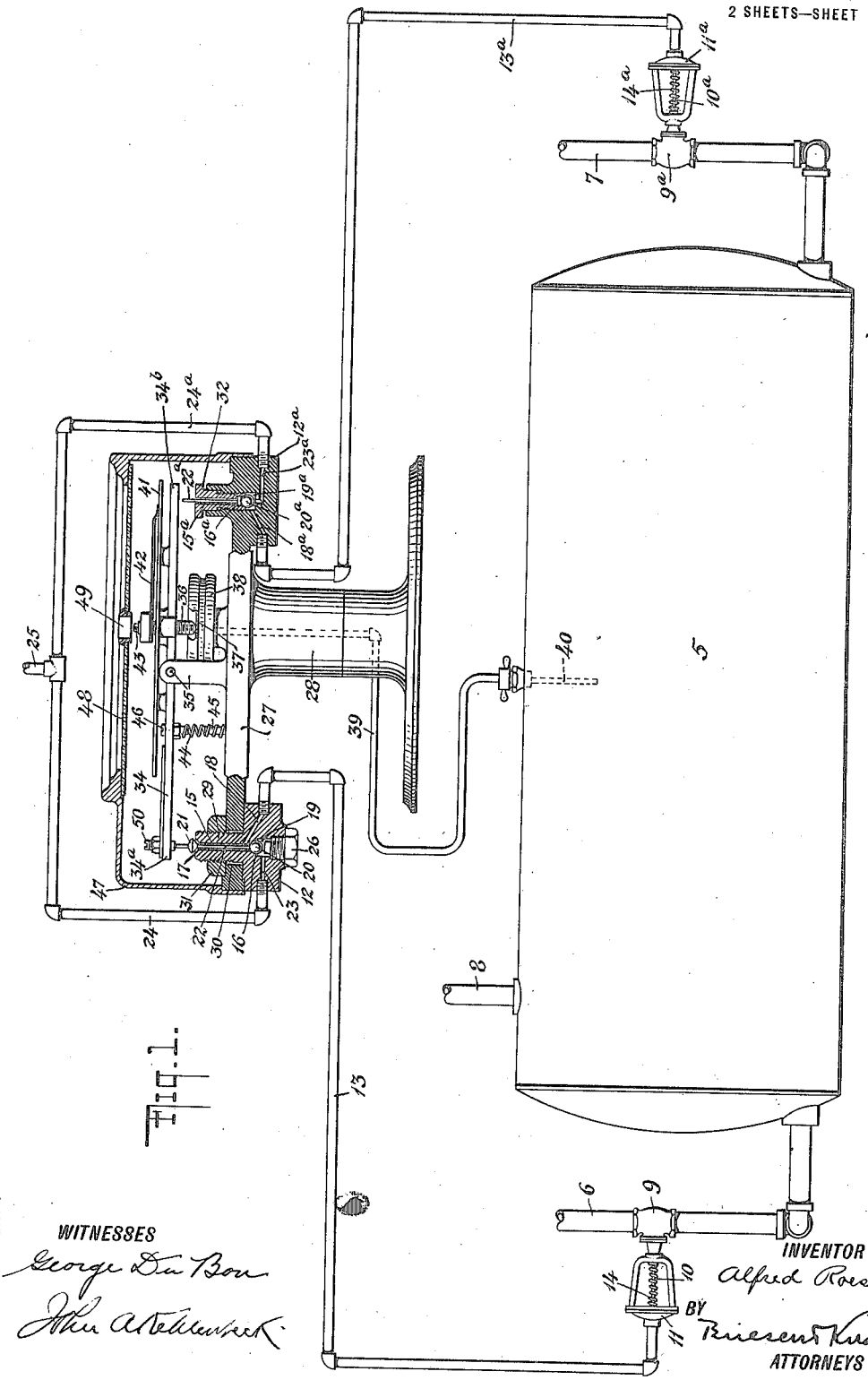

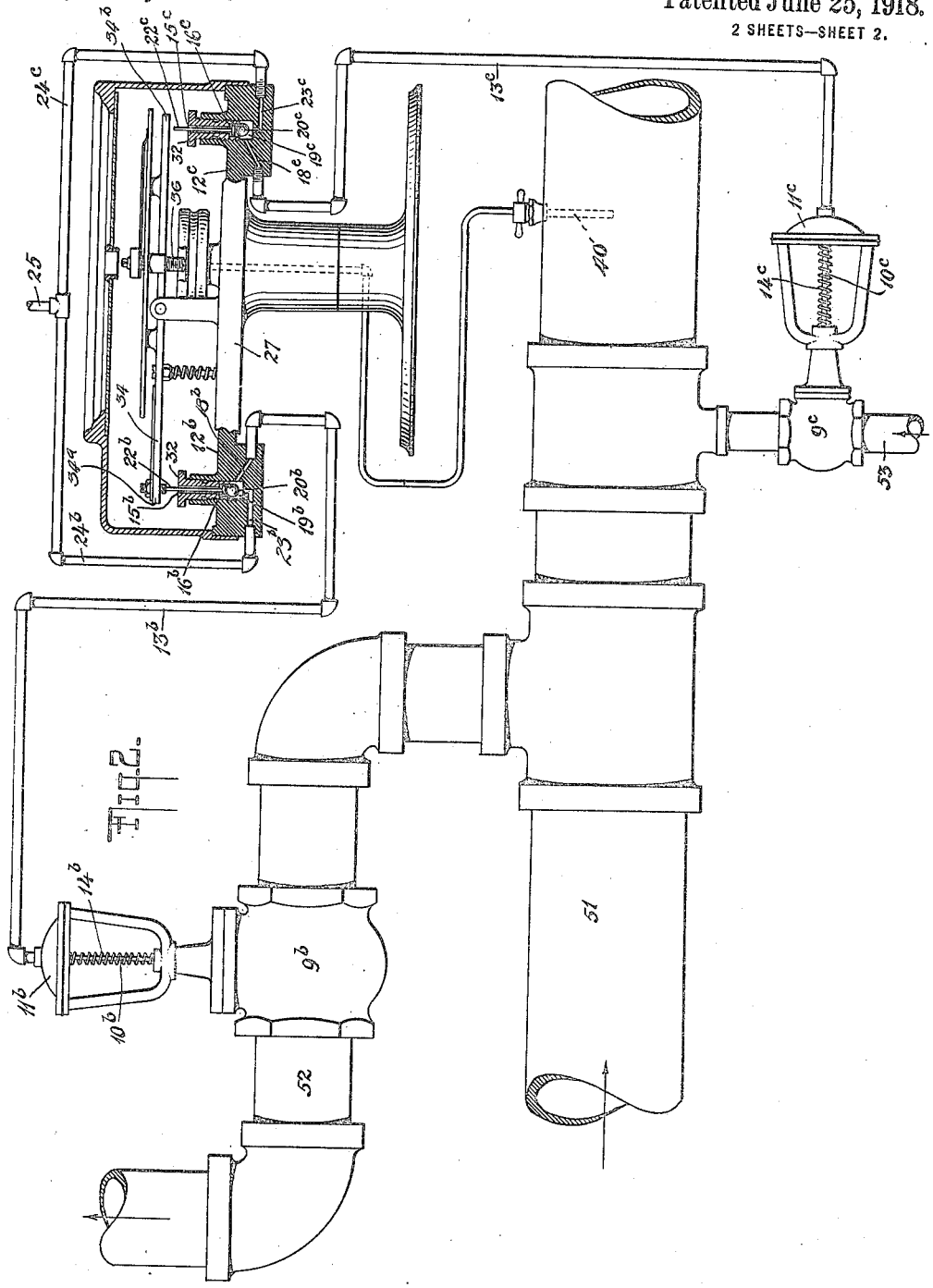

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

TEMPERATURE-CONTROLLING DEVICE.

1,270,438.   Specification of Letters Patent.   Patented June 25, 1918.

Application filed May 6, 1913. Serial No. 765,737.

*To all whom it may concern:*

Be it known that I, ALFRED ROESCH, a citizen of the United States, resident of the borough of Brooklyn, county of Kings, city and State of New York, have invented certain new and useful Improvements in Temperature-Controlling Devices, of which the following is a specification.

My invention relates to temperature controlling devices and more particularly to thermostatic temperature controlling devices and has for its object to control with a single controlling device a plurality of heat producing mediums for heating any given element or place. Heretofore separate controlling devices have been employed for controlling each heating medium and great difficulty has been encountered in adjusting such separate devices to secure a proper coöperation therebetween at the desired temperatures. This difficulty is occasioned by the fact that each controlling device must be connected at different points with the element or place at which the temperature is to be regulated, so that said devices would, in nearly all cases, be subject to or working under different conditions, thus making it almost impossible to secure the desired and accurate coöperation between the different devices. The particular object of my invention is to overcome these serious objections and difficulties by means of a simple and inexpensive construction which is absolutely reliable in action and which may be conveniently used in connection for instance with manufacturing processes, where it is essential to change the controlling points often. A still further object of my improvement is to provide a device of the character indicated which will perform its functions of controlling several heating mediums with any desired number of degrees of temperature intervening between each operation. My invention will be fully described hereinafter and the features of novelty will be pointed out in the appended claims.

Reference is to be had to the accompanying drawings which by way of example illustrate two applications of my improvement and in which Figure 1 represents a diagrammatic view, partly in section of my invention applied to a hot water tank and Fig. 2 is a similar view showing my improvement arranged for connection with a calender roll, used for instance in rubber mills or the like.

Referring more particularly to Fig. 1 of the drawings, 5 represents the hot water tank which may be of any suitable construction and which is preferably provided interiorly with two heating coils, one of which may be connected by means of a pipe 6 for instance with the exhaust of an engine, and the other of which may be connected by means of a pipe 7 for instance with a boiler or other source of high pressure or live steam. A third pipe 8 may be connected with the tank 5 for the purpose of conducting the hot water to the heating radiators or other places where it is to be used. A valve 9 controls the pipe 6 and has its stem 10 connected with a suitable diaphragm located in a diaphragm chamber 11 which latter communicates with a valve block or the like 12 through the medium of a tube 13. A spring 14 surrounds the stem 10 and serves to maintain and return the valve 9 in and to its open position whereby the exhaust steam may freely pass through the pipe 6 to the coil in the interior of the tank 5 with which it is connected. The valve block 12 is provided with a passage 15 having valve seats 16 and 17 located at opposite sides thereof, a channel 18 connecting the tube 13 with the passage 15 at a point above the valve seat 16 as clearly shown in Fig. 1 of the drawings. The outer end of the passage 15 at which the valve seat 17 is located communicates with the atmosphere while its inner end, at which the valve seat 16 is located, communicates with a valve chamber 19. Valves 20 and 21 coöperate respectively with the valve seats 16 and 17 and are connected to move in unison by means of a rod 22 which extends axially through the passage 15 and beyond the valve 17 for the purpose to be more fully described hereinafter. It is to be understood that the rod 22 is of smaller diameter than the passage 15 whereby an annular space is formed about said rod, and further that the positions of the valves 20 and 21 on the rod 22 are such that said valves will work oppositely, or in other words, one will be open or removed from its seat when the other is closed or in contact with its seat. A channel 23 in the valve block 12 connects the valve chamber 19 with a tube 24 which in turn is connected with a source of preferably compressed air or other gas in any suitable way as for instance by means of a pipe 25, the tube 24 preferably having its one end secured in said block 12. If desired the valve chamber 19 may be closed or sealed by means of a plug 26 which may be removed to make the interior of said valve chamber 19 accessible for any purpose. The valve block 12 may form part of or be removably secured in any suitable manner to a support 27 which latter preferably is provided with a standard 28 through the medium of which the support 27 may be secured in any desired position or location. In the drawings the valve block 12 is formed with a screw-threaded neck 29 which extends through an opening 30 in the support 27 and serves to accommodate a nut 31 whereby said valve block 12 is rigidly secured upon said support 27.

The pipe 7 is controlled by means of a valve $9^a$ similar to the valve 9 and having its stem $10^a$ similarly connected with a diaphragm located in a diaphragm chamber $11^a$ connected with a valve block $12^a$ for instance by means of a tube $13^a$. A spring $14^a$ also surrounds the stem $10^a$ and in the same manner as the spring 14 serves to maintain and return the valve $9^a$ in and to its open position, whereby under certain conditions of the device to be more fully explained hereinafter, live steam is admitted to the coil within the tank 5 with which the pipe 7 is connected. The valve block $12^a$ is carried by the support 27 and as shown is an integral part thereof although if desired, the said valve block $12^a$ may be constructed and detachably secured to said support in the same manner as is the block 12. It will also be apparent that the block 12 may be constructed as an integral part of the support 27 in the same way as is the block $12^a$ should this be found desirable. The valve block $12^a$ is constructed with a channel $18^a$ which connects the tube $13^a$ with a valve chamber $19^a$ in said valve block $12^a$, said chamber being connected by means of a channel $23^a$ with a tube $24^a$, the latter in turn communicating with the pipe 25 or being in any other manner connected with a source of preferably compressed air or other gas. A screw plug 32 preferably screws into the support 27 and extends into the valve chamber $19^a$, the lower end of said plug 32 being preferably formed with a valve seat $16^a$ located at the end of a passage $15^a$ extending through the plug 32 and connecting said valve chamber $19^a$ with the atmosphere. A valve $20^a$ coöperates with the seat $16^a$ and is carried by a stem $22^a$, which extends lengthwise of the passage $15^a$ and beyond the plug 32 for the purpose to be more fully described hereinafter. The support 27 is provided with preferably integral and upright lugs 33 on which a lever 34 is pivoted at 35, said lever extending in opposite directions from said pivot with its opposite ends $34^a$ and $34^b$ over the free ends of the rods 22 and $22^a$ respectively. This lever 34 at an intermediate point carries a preferably screw-threaded adjustable projection 36 the one end of which engages a diaphragm 37 located in or closing a diaphragm chamber 38 which latter is connected by means of a tube 39 with a bulb 40 suitably secured in position so as to extend into the interior of the tank 5, the said bulb 40 being partially or entirely filled with a suitable liquid or gaseous fluid which is susceptible to changes in temperature, the said bulb comprising what might be termed a sensitive member. The lever 34 further carries a scale plate 41 suitably graduated to indicate degrees of temperature and which coöperates with a pointer 42 secured to the projection 36 whereby the apparatus may be set to operate at predetermined temperatures, the projection 36 being preferably provided with an angular head 43 for accommodating a suitable key or other instrument by means of which the adjustment of the said projection and consequently the device may be facilitated. A spring 44 has its one end in engagement with the support 27 and preferably surrounds a pin 45 thereon and has its other end abutting against a screw 46 located on the lever 34, the said spring 44 serving to maintain the end of the projection always in contact with the diaphragm 37. By manipulating the screw 46 the tension of the spring 44 may be properly adjusted. If desired a cover 47 having a transparent portion 48 may be secured upon the supoprt 27 so as to protect the otherwise exposed parts of the thermostatic controller, a suitable opening 49 being in this case provided in the transparent portion 48 for permitting access to the angular head 43 of the projection 36. In order that the number of degrees of temperature between the successive control of the heating mediums may be varied, I prefer to provide the lever 34 with an adjustable screw 50 adapted to be moved toward and away from the stem 22 as shown in the drawings. By adjusting this screw 50 the opposite end of the lever 34 is brought nearer to or farther away from the stem $22^a$, and the degrees between the operation of the valves 20 and $20^a$ thus increased or diminished.

With the parts in the position shown in the drawing the valve 9 is open and the exhaust steam may freely pass through the pipe 6 into its coil in the tank 5 and the valve $9^a$ is closed so that live or high pressure steam does not reach the interior of said tank. This condition of the apparatus is due to the fact that the valve 20 is in engagement with the seat 16 and thus closed while the valve 21 is removed from the seat 17 and open, so that the tube 13 is open to the atmosphere through the channel 18 and passage 15 and is cut off from communication with the tube 24 and pipe 25 and consequently from the source of compressed air or other gas. Under these conditions the spring 14 will maintain the valve 9 in its open position. At the same time owing to the fact that the valve $20^a$ is in engagement with its seat $16^a$ the tube $13^a$ is cut off from the atmosphere and is in communication with the pipe 25 and source of compressed air or other gas through the channel $15^a$, valve chamber $19^a$, channel $23^a$, and tube $24^a$. The said compressed air or gas thus passes through the tube $13^a$ into the diaphragm chamber $11^a$ and depresses the diaphragm therein and closes and maintains closed the valve $9^a$ against the tension of its spring $14^a$.

If the temperature in the tank begins to drop the pressure beneath the diaphragm 37 will be relieved owing to the fact that the liquid or gaseous fluid in the bulb 40 and the tube 39 begins to return toward its initial conditions, which will cause said diaphragm 37 to return toward its normal position. The projection 36 will follow the diaphragm 37 in its movement and will cause a movement of the lever 34 on its pivot 35 partly by gravity and partly under the influence of the spring 44, an operation which will move the end $34^a$ of the lever 34 away from the rod 22 and the end $34^b$ of said lever toward the rod $22^a$. A continued drop in the temperature in the tank 5 will cause a continuation of the movement of the diaphragm 37 and lever 34, the end $34^b$ of which will finally engage and depress the rod $22^a$ and thus move the valve $20^a$ away from its seat $16^a$ against the air or gas pressure in the chamber $19^a$ and over the end of the passage $23^a$ to close the latter. By this means the tube $13^a$ is thrown into communication with the atmosphere through the channel $18^a$, valve chamber $19^a$ and passage $15^a$ and the pressure of the compressed air or gas is removed from the diaphragm in the chamber $11^a$ which being thus relieved no longer overcomes the tension of the spring, and the latter is accordingly free to move the valve $9^a$ to an open position. In this condition of the parts live or high pressure steam is admitted to the interior of the tank 5 in addition to the exhaust steam which is still passing into said tank through the tube 13. This will cause the temperature in the tank 5 to begin to rise and the liquid or gaseous fluid in the bulb 40 and tube 39 to expand and again exert a pressure beneath the diaphragm 37, which is thus again raised and consequently lifts the projections 36. By this means the lever 34 is swung in the reverse direction on its pivot 35 so as to cause the end $34^b$ to remove its pressure from the rod $22^a$ and finally to release the same entirely and the end $34^a$ to move toward the rod 22. As soon as the rod $22^a$ has been released from the influence of the lever 34, the compressed air or gas in the channel $23^a$ and the tube $24^a$ will raise the valve $20^a$ from the end of the channel $23^a$ and into contact with the seat $16^a$. This will cut off the tube $13^a$ from the atmosphere and will connect it with the source of compressed air or other gas, which will thus again pass through the tube $24^a$, channel $23^a$, chamber $19^a$, channel $18^a$ and tube $13^a$ into the diaphragm chamber $11^a$. The diaphragm in said chamber $11^a$ will therefore again be pressed inward and the valve $9^a$ closed against the tension of the spring $14^a$, and the flow of live or high pressure steam to the tank 5 consequently cut off. If after the high pressure or live steam has been cut off the temperature for any reason still continues to rise, the lever 34 will be swung still farther on the pivot 35 owing to the continued pressure of the diaphragm 37 on the projection 36 and its end $34^a$ finally caused to move or press the rod 22 in the direction of its length. This operation will move the valve 21 to its seat 17 and close said valve and at the same time will move the valve 20 away from its seat 16 and open said valve, thus disconnecting the tube 13 from the atmosphere and bringing it into communication with the source of compressed air or gas through the tube 24, chamber 19, passage 15 and channel 16. This compressed air or gas will in consequence pass through the tube 13 and into the chamber 11 and will move the diaphragm therein inwardly and in consequence close the valve 9 against the tension of the spring 14 so that in this way the flow of exhaust steam to the tank 5 is also cut off. When the temperature begins to drop owing to the fact that no steam of any kind is entering the tank 5 the end $34^a$ of the lever 34 will be moved in a direction away from the rod 22 so that finally the compressed air or gas will move the valve 20 into engagement with its seat 16 and the valve 21 away from its seat 17 and thus restore the parts to the condition shown in Fig. 1 of the drawing. Should the temperature in the tank rise above predetermined points when the parts are as illustrated in Fig. 1 then the lever 34 will at once be operated as last described and its end $34^a$ caused to operate the valves 20 and 21 in the manner set forth to interrupt the flow of exhaust steam to the tank 5. It is to be understood that the valves 20 and 21 and the valve $20^a$ are maintained in the positions shown in Fig. 1 of the drawings by the pressure of the compressed air or gas in the chambers 19 and $19^a$ respectively.

Referring now more particularly to Fig. 2 of the drawings 51 represents a conduit or pipe which is connected at one end for instance with the exhaust of an engine and at its end communicates for instance with the interior of a calender roll of any type for instance such as used in rubber mills, whereby exhaust steam is conducted to the said rolls through the pipe 51 to heat the same. An exhaust pipe 52 is connected with the pipe 51 and communicates with the atmosphere, while another pipe 53 connects the pipe 51 with a boiler or other source of live or high pressure steam, the pipe 53 communicating with the pipe 51 at a point beyond the connection with the exhaust pipe 52.

A valve $9^b$ similar to the valves 9 and $9^a$ controls the exhaust pipe 52 and similarly has its stem $10^b$ connected with a diaphragm located in a diaphragm chamber $11^b$, the said chamber being connected with a valve block $12^b$ through the medium of a tube $13^b$. A spring $14^b$ preferably surrounds the stem $10^b$ and serves to return the valve $9^b$ to and maintain it in its open position under certain conditions of the apparatus as will appear more clearly hereinafter. A similar valve $9^c$ controls the pipe 53 and also has its stem $10^c$ connected with a diaphragm in the diaphragm chamber $11^c$ which latter is also connected by means of tube $13^c$ with a valve block $12^c$, a spring $14^c$ being also provided for returning and maintaining the valve $9^c$ to and in its open position at certain times. The two valve blocks may be similar in construction to either of the valve blocks shown in Fig. 1 of the drawings and are similarly carried by a support 27. Thus each valve is provided with a valve chamber $19^b$ and $19^c$ respectively, which chambers communicate with the tubes $13^b$ and $13^c$ by means of channels $18^b$ and $18^c$ respectively. Channels $23^b$ and $23^c$ lead from said valve chambers $19^b$ and $19^c$ to tubes $24^b$ and $24^c$ which in turn are connected in any suitable manner as for instance by means of the pipe 25 with a source of compressed air or other gas. Each valve block $12^b$ and $12^c$ is further provided with a screw-threaded plug 32 having an axial passage $15^b$ and $15^c$ extending therethrough, said channels communicating at their outer ends with the atmosphere and at their inner ends with the valve chambers $19^b$ and $19^c$, valve seats $16^b$ and $16^c$ similar to the valve seat $16^a$ being located at the inner end of each passage $15^b$ and $15^c$. Valves $20^b$ and $20^c$ are located in the chambers $19^b$ and $19^c$ and are connected with rods $22^b$ and $22^c$ extending through and beyond the passages $15^b$ and $15^c$ respectively, the said rods being smaller in diameter than the said passages in the same way as in Fig. 1. The remaining parts of the device or apparatus may be the same as in the first form of my improvement.

With the parts in the condition illustrated in Fig. 2 the compressed air or other gas entering the chambers $19^b$ and $19^c$ will maintain the valves $20^b$ and $20^c$ against the seats $16^b$ and $16^c$ so that said compressed air or other gas passes from the tubes $24^b$ and $24^c$ through channels $23^b$ and $23^c$ into the chambers $19^b$ and $19^c$, and thence through the channels $18^b$ and $18^c$ and tubes $13^b$ and $13^c$ to the diaphragm chambers $11^b$ and $11^c$. The diaphragms in said chambers $11^b$ and $11^c$ will thus be under pressure and will in consequence maintain the valves $9^b$ and $9^c$ in closed condition against the tension of the springs $14^b$ and $14^c$ so that the exhaust pipe 52 is closed and no live or high pressure steam can reach the pipe 51. Under these circumstances exhaust steam will pass through the pipe 51 to the calender roll and in its passage will contact with the bulb or sensitive member 40 which in this form of my invention extends into the pipe 51 and thus into the path of the exhaust steam. The position of said bulb 40 further is such that it will also be in the path of the live or high pressure steam when the valve $9^c$ is open as will be hereinafter more fully brought out.

If the temperature begins to fall the diaphragm 37 will move downwardly and thus permit the projection 36 to drop, which will cause the lever 34 to swing on its pivot 35 in the same manner as in Fig. 1. As the temperature continues to fall the end $34^b$ of the said lever will finally engage and depress the rod $22^c$ and in consequence will move the valve $20^c$ away from the seat $16^c$ and over the end of the channel $23^c$ to close the latter. By this means the tube $13^c$ will be cut off from the source of compressed air or other gas and will be thrown into communication with the atmosphere, thus relieving the diaphragm in the chamber $11^c$ from pressure and permitting the spring $14^c$ to open the valve $9^c$ and live or high pressure steam to enter the pipe 51 through the pipe 53. As the temperature begins to rise again the lever 34 will be swung on its pivot 35 in the reverse direction, whereby the end $34^b$ will be moved away from the rod $22^c$ and the valve $20^c$ will be returned to its seat $16^c$ by the pressure of the air or other gas in the chamber $19^c$. The tube $13^c$ will thus again be cut off from the atmosphere and again connected with the source of compressed air or other gas which will again depress the diaphragm in the chamber $11^c$ and thus again close the valve $9^c$ against the tension of the spring $14^c$ and shut off the flow of live steam to the pipe 51. Should the temperature continue to rise from any cause even after the high pressure steam has been cut off then the diaphragm 37 will continue to swing the lever 34 and will cause its end $34^a$ to depress the rod $22^b$ and thus move the valve $20^b$ away from the seat $16^b$, and over the end of the channel 23$^b$ to close the latter. In this manner the tube 13$^b$ is disconnected from the source of compressed air or gas and is thrown into communication with the atmosphere, so that pressure on the diaphragm in the chamber 11$^b$ is removed and the valve 9$^b$ is opened through the medium of the spring 14$^b$. The pipe 51 is thus opened to the atmosphere through the exhaust pipe 52 so that a portion at least of the exhaust steam passes out through the exhaust pipe 52 and consequently does not reach the roll. In consequence the temperature at the bulb 40 will begin to drop and the lever 34 will return to the position shown in Fig. 2 and the valve 20$^b$ will be moved back to the seat 16$^b$ by the pressure of the air or gas in the chamber 19$^b$. The compressed air or other gas now again passes through the tube 13$^b$ and depresses the diaphragm in the chamber 11$^b$ and again closes the valve 9$^b$ and thus disconnects the pipe 51 from communication with the atmosphere. Under these conditions the parts will again be in the position shown in Fig. 2 and all of the exhaust steam will pass through the pipe 51 and to the calender roll.

Should the temperature rise when the parts are as shown in Fig. 2 the lever 34 will be rocked and its end 34$^a$ caused to immediately depress the rod 22$^b$ to operate the various parts and cause the valve 9$^b$ to be opened as last described above.

It will be seen that with my invention I overcome by means of a very simple efficient and inexpensive device all of the difficulties heretofore experienced in the art to which this application pertains. In the first place, having but one thermostatic member, its various functions will always be performed successively and in unison at the temperatures at which they are intended to be performed. In the second place, the controller can be adjusted to perform the various functions with any number of degrees intervening between them and the relation between the various functions will always remain the same at any temperature settings.

The invention may be used in many ways as for instance as shown in Fig. 2 for controlling the temperature of a hot water tank, which as stated is supplied with two heating coils, one coil connected with the exhaust steam, from an engine, and the other coil with high pressure steam. In this instance the object is to use all the exhaust steam from the engine, but when this is not sufficient to keep up the desired temperature of the water in the tank to allow just enough high pressure steam to pass into the other coil to maintain the temperature of the water at the desired degree.

As shown in Fig. 2 another instance where the present invention may be advantageously applied is to a calender roll, used for instance in rubber mills. It is to be understood that these are only examples of the use to which my improvement may be put and that the same may be utilized in many other ways.

In large dry rooms it is essential to have a large heating surface in order to bring the temperature of the room up to the desired temperature quickly, and when this temperature has been reached, to make it necessary to use only a small portion of the heating surface to maintain the temperature at a substantially fixed point. It is impossible to get any satisfactory control with a single-function controller, for the reason, that, although the controller shuts off the steam at the temperature for which it is set, the heat radiating from so large a surface will raise the temperature many degrees above the desired temperature. This also causes an unnecessary waste of steam.

With my two-function controllers I get perfect control and eliminate the waste of steam, by dividing the heating coils into two properly proportioned sections and using all the coils to bring the dry room up to within a few degrees of the desired temperature, then shutting off the large section of the heating coil and using the smaller section to keep up the desired temperature. It is to be understood that the mechanism which controls the valves for turning on or shutting off the heating mediums may be of any type as long as the same is controlled by a single sensitive member and controls all of the valves.

Various changes in the specific form shown and described may be made within the scope of the claims without departing from the spirit of my invention.

I claim:

1. In a device of the character described the combination of an element to be heated, a plurality of means for heating same, independent fluid operated means for controlling each of said heating means, a sensitive member adapted to be affected by the temperature of said element and an actuating device common to all of said controlling means and connected directly with said sensitive member so as to be directly operated thereby.

2. In a device of the character described the combination of an element to be heated, a plurality of means for heating same, independent fluid operated means for controlling each of said heating means, a sensitive member adapted to be affected by the temperature of said element and an actuating device common to all of said controlling means and connected directly with said sensitive member to successively and directly actuate each controlling means.

3. In a device of the character described the combination of an element to be heated, a plurality of means for heating sa1e, independent fluid operated means for controlling each of said heating means, a sensitive member adapted to be affected by the temperature of said element and an actuating lever common to all of said controlling means and directly connected with said sensitive member so as to be directly operated thereby.

4. In a device of the character described the combination of an element to be heated, a plurality of heating mediums for heating same, independent valves for controlling the flow of each heating medium, fluid operated means for actuating said valves, a sensitive member adapted to be affected by the temperature of said element, and a pivoted actuating lever common to all of said valves and directly connected with said sensitive member so as to be directly operated thereby.

5. In a device of the character described the combination of an element to be heated, a plurality of pipes for conducting a plurality of heating mediums to said element, a valve in each of said pipes for controlling the flow of said heating mediums therethrough, additional fluid operated valves for controlling the valves in said pipes, a sensitive member arranged to be affected by the temperature of said element and a single movable lever directly connected with said sensitive member and arranged to be directly actuated thereby to operate said additional valves whereby the valves in said pipes are operated.

6. In a device of the character described, the combination of a tank arranged to be heated, a connection from said tank to a source of heat supply, a second connection from said tank to another source of heat supply, a valve in each of said connections, additional valves, connections from said additional valves to each of said first named valves, a single lever adapted to actuate each of said additional valves whereby said first named valves are operated and a sensitive member adapted to be affected by the temperature of said tank and to actuate said lever.

7. In a device of the character described the combination of an element to be heated, a plurality of means for heating same, independent means for controlling each of said heating means, a sensitive member adapted to be affected by the temperature of said element, an actuating device operated by said sensitive member to successively actuate said controlling means and an adjustable means whereby the number of degrees between successive controlling operations may be varied.

8. In a device of the character described the combination of an element to be heated, a plurality of pipes for conducting a plurality of heating mediums to said element, a valve in each of said pipes for controlling the flow of said heating mediums therethrough, independent fluid operated means for controlling each of said valves, a sensitive member arranged to be affected by the temperature of said element, and an actuating device common to all of said controlling means and directly connected with said sensitive member so as to be directly operated thereby.

In testimony whereof I have hereunto set my hand in the presence of two subscribing witnesses.

ALFRED ROESCH.

Witnesses:
JOHN A. KEHLENBECK,
GEORGE DU BON.